United States Patent [19]

Vahab

[11] Patent Number: 4,945,489
[45] Date of Patent: Jul. 31, 1990

[54] LASER TIME-SHARING SYSTEM

[75] Inventor: Christian Vahab, Fountain Valley, Calif.

[73] Assignee: Robolase Systems, Inc., Costa Mesa, Calif.

[21] Appl. No.: 198,337

[22] Filed: May 25, 1988

[51] Int. Cl.$^5$ .................... B23K 26/00; G06F 15/20
[52] U.S. Cl. .................... 364/505; 364/474.08; 219/121.63; 219/121.78
[58] Field of Search .............. 364/505, 525, 474.08; 219/121.6, 121.63, 121.78, 121.85

[56] References Cited

U.S. PATENT DOCUMENTS

| 3,751,643 | 8/1973 | Dill et al. | 364/525 |
| 4,518,843 | 5/1985 | Antol et al. | 219/121.63 |
| 4,545,018 | 10/1985 | Clements et al. | 364/474.08 |
| 4,547,855 | 10/1985 | Lanyi et al. | 364/474.08 |
| 4,746,205 | 5/1988 | Cross et al. | 350/169 |
| 4,820,899 | 4/1989 | Hikima et al. | 219/121.78 |
| 4,843,209 | 6/1989 | Milligan | 219/121.78 |
| 4,868,361 | 9/1989 | Chande et al. | 219/121.78 |

Primary Examiner—Felix D. Gruber
Assistant Examiner—Ellis B. Ramirez
Attorney, Agent, or Firm—Price, Gess & Ubell

[57] ABSTRACT

A laser multiplexing system is capable of time-sharing high-power laser output among a number of work stations. The laser beam is directable in quick succession into the ends of various optic fibers leading to remote work stations. The precise position of focus of the beam into each fiber is originally determined and continually monitored during the beam travel cycle for each work station.

19 Claims, 4 Drawing Sheets

LASER TIME-SHARING SYSTEM

BACKGROUND OF THE INVENTION

1. Field of the Invention

This invention relates to a laser multiplexer, and more specifically to a system capable of time-sharing the output of a single high-power laser source among a number of remote work stations.

2. Description of the Prior Art

Lasers, and in particular, high-power lasers, have become an increasingly important tool in industry. The speed and accuracy with which a laser beam is capable of delivering very high energy concentrations is unequalled. High-power lasers are therefore most often employed in delicate cutting and welding operations.

A convenient, efficient and safe means of transmitting laser energy to a remote work station may be accomplished by the use of optic fibers. Once a beam has been properly introduced into such a fiber, it can arrive at remote stations with only a minimal amount of power and coherency loss. Proper introduction of the laser energy into a fiber, however, poses a formidable technical problem.

Precise alignment is required. Misalignment of a high-power laser can cause serious damage or destruction to the fiber and nearby equipment. Precise alignment will also maximize the power available at the work station. The potential for injury aside, visual alignment of the beam itself is precluded by the fact that most high-power lasers operate at frequencies outside the visual spectrum.

Coaxially aligned low-power alignment laser beams emitting in the visible spectrum are required to accomplish the task of alignment. The focusing of the visible beam onto the end of the optical fiber can then be gauged via optical inspection through a microscope. Such an operation is tedious and does not ensure the precision required to make full use of the laser's power.

The laser is capable of delivering most energy requirements via an extremely short pulse or a series of pulses. Manipulation of the workpiece typically requires substantially more time. Consequently, the laser spends the vast majority of its time inoperative or idling. Attempts at deriving a more efficient laser system have been limited to sharing a power supply with a series of laser heads. While such a system obviates the need for multiple power supplies, it still requires a multiplicity of expensive laser heads. A system capable of efficiently time-sharing the output of a single high-power laser source among a number of work stations has until now eluded the art.

OBJECTS AND SUMMARY OF THE INVENTION

An object of the present invention is to provide a system for time-sharing the output of a high-power laser source among a plurality of remote work stations;

Another object of the invention is to provide a time-sharing system that is self-aligning and capable of continuously monitoring the high-power laser beam alignment;

A further object of the invention is to provide a time-sharing system capable of detecting and reacting to a dangerous misalignment condition;

Yet another object of the present invention is to provide a time-sharing system that supplies laser energy to a plurality of ready work stations in a sequence that makes the most efficient use of the laser; and A still further object of the present invention is to provide a high-power laser time-sharing system for precision welding work stations as used in the manufacture of gold chains and jewelry or interocular lenses.

The time-sharing system according to the present invention utilizes a single laser light source that is switched from one station to another in very quick succession by selectively, repeatedly and precisely focusing it on each one of a plurality of fiber-optic conduits. Each conduit directs the beam to a respective work station. The time-sharing system continually monitors the laser output at each work station. A misalignment is detected by a drop in output. An automatic realignment procedure is triggered as soon as the drop in power output is detected. The realignment procedure precisely refocuses the laser beam on the fiber-optic conduit which exhibits the drop in power output. The refocus is achieved by sequentially adjusting the focus of the laser beam on the conduit input until a maximum output intensity is achieved.

BRIEF DESCRIPTION OF THE DRAWINGS

Other objects and many of the attendant advantages of this invention will be readily appreciated as the same becomes better understood by reference to the following detailed description when considered in conjunction with the accompanying drawings, in which like reference numerals designate like parts throughout the figures thereof, and wherein.

DESCRIPTION OF THE PREFERRED EMBODIMENTS

Figure 1:
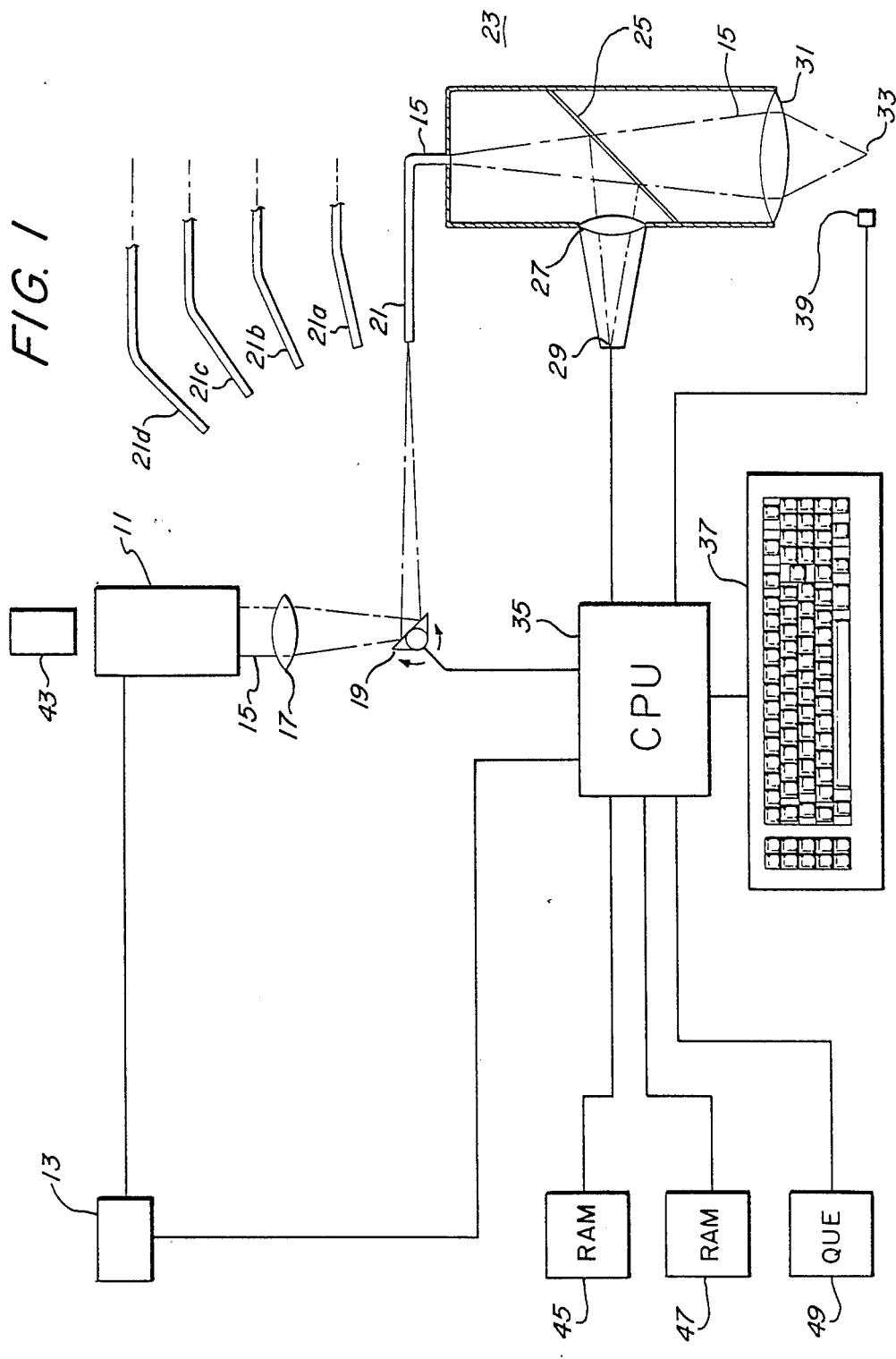
FIG. 1 is a schematic representation of the entire laser multiplexing system.

FIG. 1 illustrates the general layout of a laser multiplex system according to the present invention. A laser 11 projects a laser beam 15 through a condensing lens 17 onto a movable mirror 19. The ends of a plurality of optic fibers 21 or fiber-optic cables are positioned at the focus of the beam. Each optic fiber or cable leads to a remote work station 23 where the laser beam is put to use.

At the work station, a portion of the beam is reflected onto a detector 29 such that the intensity of the beam arriving at the station can be measured. A central processing unit 35 controls the power supply 13 for the laser and the positioning of the mirror 19 in response to signals from station readiness indicators 39, the output detectors 29 and from information stored in the RAM or entered via a keyboard 37.

A laser suitable for use in the system of the present invention is a Nd:YAG laser. Such a laser can deliver pulsed energy at a wavelength of 1.06 microns. The amount of power available is variable. Each pulse can deliver up to about 12 kilowatts. In addition to the power of each pulse, the number of pulses, duration of each pulse, and the interval between each pulse can be varied. The output of the laser can thereby be fine tuned to match the requirements of a particular operation. The laser's output is varied by controlling the power supply 13.

In order to properly insert the beam into a fiber-optic cable 21, it is necessary to focus the beam down to a size commensurate with the diameter of the cable 21. A condensing lens 17 is used for this. The total distance from the lens 17 to the end of the fiberoptic via the mirror 19 must correspond to the focal length of the lens 17. The mirror 19 placed in the path of the beam 15 is movable. Its positioning is precisely reproducible. The ends of the optic fibers 21 are arranged such that the reflected beam distance from the lens to the optic fiber is held constant at precisely the focal length of the lens 17.

In the simplest configuration, a linear arrangement of optic fibers 21–21d is used corresponding to the one dimension of movement available to the mirror 19. An alternate embodiment (not shown) may incorporate the use of a second mirror capable of reflecting the beam in a second dimension so that a two-dimensional arrangement of optic fibers can be supplied by the single laser beam 15. Depending upon the fiber cable diameter, substantial lengths of cable can be used. Up to, for example, 300 feet could be used with only minimal power losses. This enables convenient placement of a work station 23 away from other work stations and away from the laser 11.

Upon the laser beam 15 arriving at the work station 23, it is focused down to a point 33 by a lens 31. A very small portion of the laser energy is diverted by a partially reflective mirror 25 through another condensing lens 27 onto a photodetector 29. A reflectance of approximately 0.01% is sufficient to supply a representative signal to the photodetector while causing only a negligible power loss in the total power delivered to the work point 33.

The YAG laser 11 used to supply the high-power requirements at the work station 23 operates in the infrared spectrum. It is not visible to the naked eye. As a safety feature, a low-power laser 43 operating in the visible spectrum projects a beam coaxially aligned with the high-power laser. For instance, a HeNe laser emitting a bright red beam can be aligned behind the YAG laser to project its beam through the YAG laser, the same optics, mirrors, cables and reflectors so that the presence and location of the invisible IR beam can readily be seen and avoided.

Figure 2:
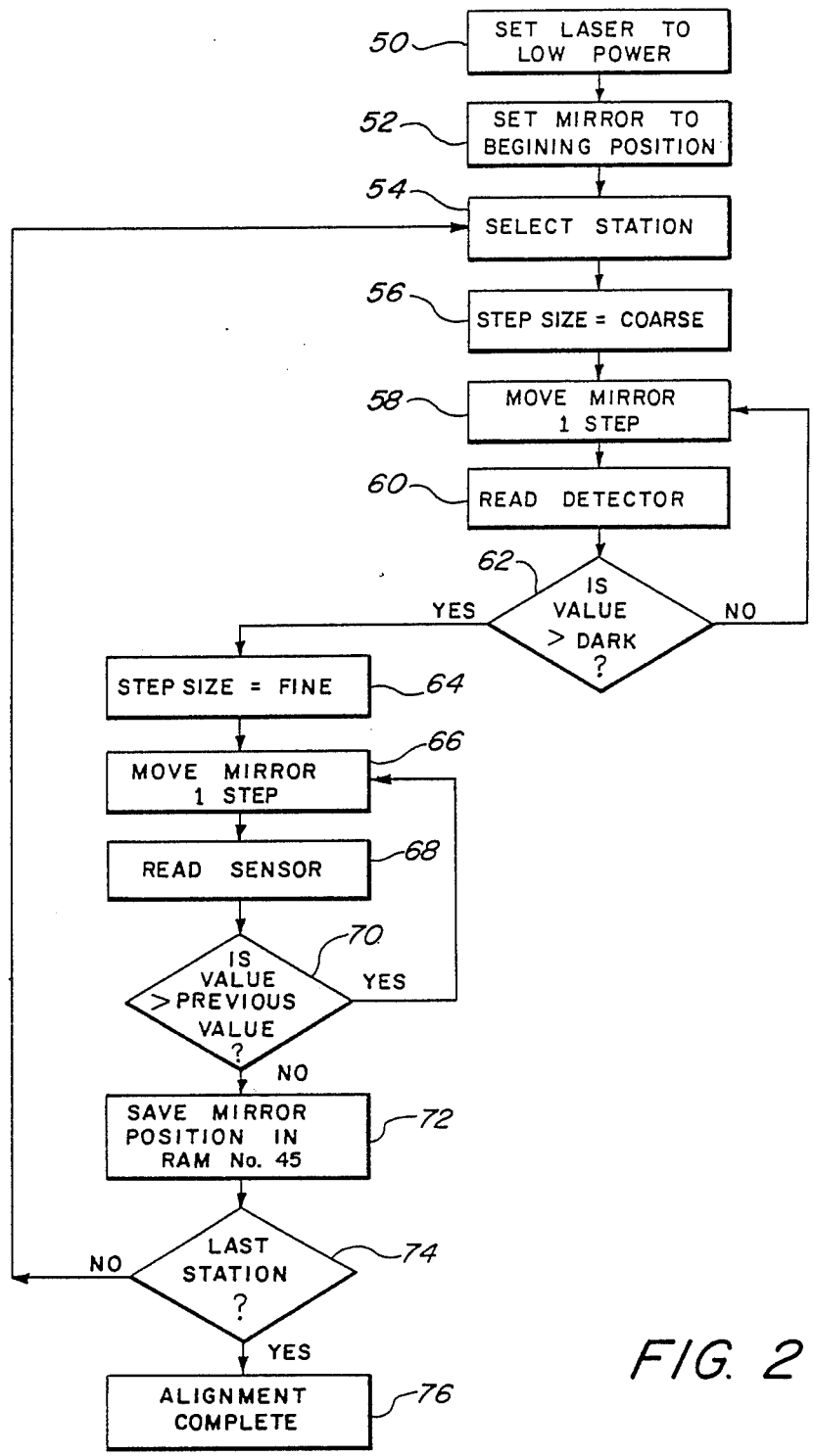
FIG. 2 is a flow chart illustrating the alignment sequence.

FIG. 2 illustrates the alignment sequence used to determine the precise positions of the mirror 19 necessary to align the laser beam with each of the optic fiber ends. The first step 50 involves setting the YAG laser to a low-power setting, low enough to preclude any damage resulting from misalignment of the beam, yet high enough to generate a sufficient signal at the detector in the work station.

The second step 52 after startup is to set the mirror 19 to a beginning position. The third step 54 is to select a particular remote work station. The mirror drive is then directed to move in a coarse stepped manner 56, so that the mirror can be quickly advanced to the cable end of the selected work station. A first coarse step 58 is then triggered. The detector output 29 at the selected work station is read 60. A decision is made 62 whether the detector output value is above a predetermined minimum. Since the diameter of the beam at the point of focus is very small, the detector output value will only move above a minimum level when the scanning beam initially illuminates the edge of the optic fiber for the selected work station. Until the detector output value is above a minimum level, the mirror continues to be stepped in the coarse stepwise manner.

When the selected detector output uses above the predetermined minimum 62, the beam is at the selected optic fiber. After this decision 62 is made, the mirror drive is set 64 to step the mirror in "fine" steps. The mirror is thereafter moved in individual fine or much smaller steps 66. Each reading taken by the detector 68 after each small step movement of the mirror is compared to the previous value read by the detector 70. If the detected value continues to increase, the movement of the mirror is continued. The point at which the detected value starts to decrease, or the detected value is equal to the previous detected value, demarks the optimum alignment of the laser. This position of the mirror is stored 72 in mirror position RAM 45 (FIG. 1).

The above alignment process is repeated for each work station to be operated. For each new work station selected 54, the process is repeated to determine the optimal mirror position, which is then stored 72 in memory. Upon completion of the alignment procedure for the entire system, an optimum mirror position for each work station is stored in the mirror position RAM 45 (FIG. 1).

Figure 3:
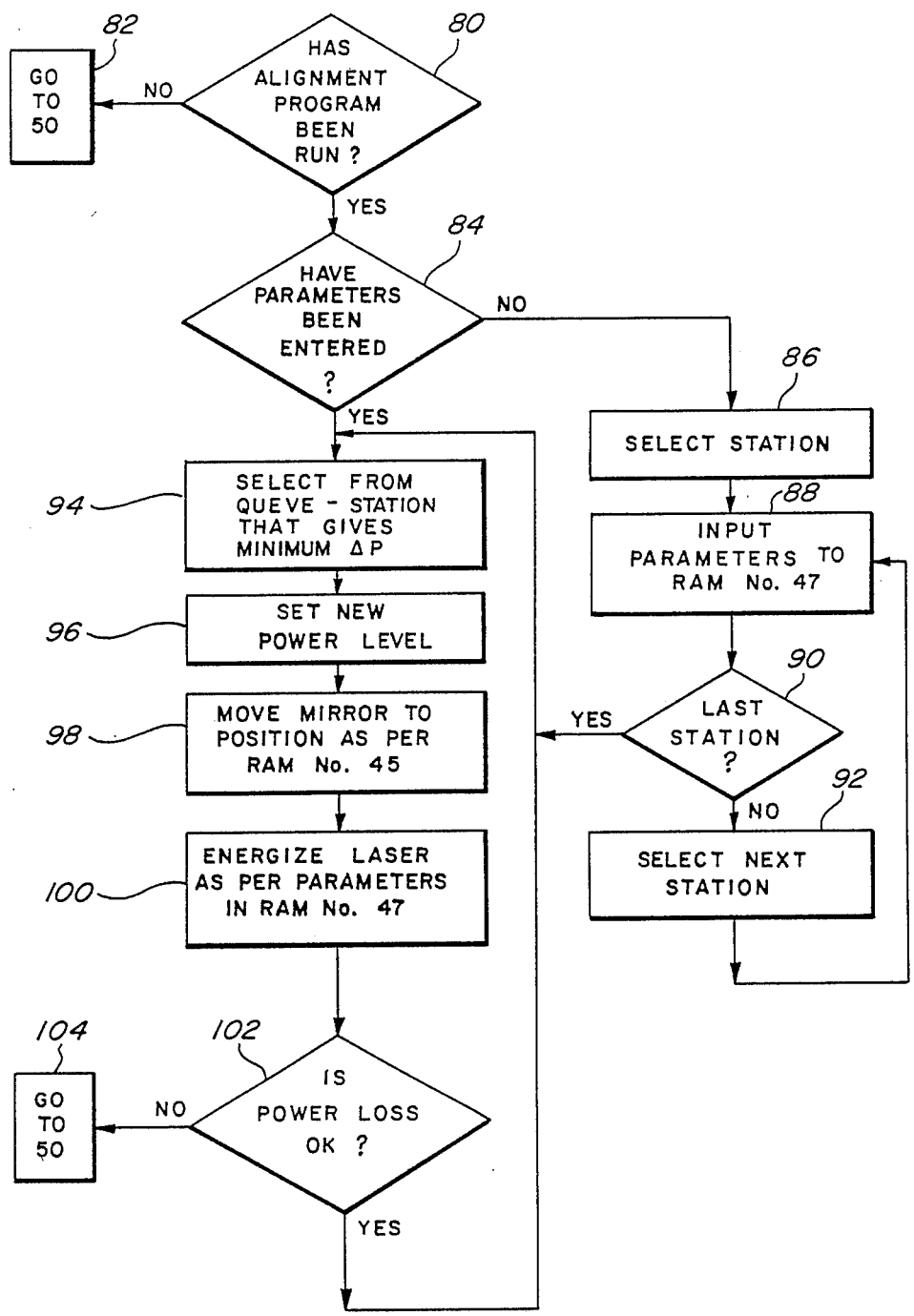
FIG. 3 is a flow chart illustrating the operating sequence of the system.

Once the optimum mirror position for each work station has been determined, the laser is ready to be used in its operative mode. The work cycle for the laser is illustrated in FIG. 3. Each work station is in communication with the CPU 35 (FIG. 1). Whenever a station is ready to receive the laser beam, a signal is sent to the CPU 35 either directly or via some other program, which may be serving to manipulate a workpiece (not shown), for example.

A queue 49 (FIG. 1) stores all available stations ready to accept the laser beam. All stations need not have identical power requirements. It is possible to enter different parameters for each station. These parameters specify the power level of each pulse, the total number of pulses, pulse duration and pulse intervals. The subroutine steps 86 through 92 serve to enter these parameters into a parameter RAM 47 (FIG. 1). The parameters may be entered via a keyboard 37 (FIG. 1).

A particular station is selected 94 from queue 47 (FIG. 1) on the basis of its power requirement. It is most efficient to minimize the power fluctuations of the laser. Therefore the station requiring the smallest change in power from the previous station is selected from the queue. The new power level as specified in the parameter RAM 47 is set 96.

The mirror is moved 98 into the position required by that particular station as stored in the mirror position RAM 45. The laser is energized 100 according to the parameters previously entered in the parameters RAM 47.

The switching from station to station is accomplished on the order of milliseconds. The multiplexing system of the invention therefore provides for an extremely efficient use of the high-power laser.

The amount of power actually getting to the work station may be continually monitored and compared 102 to the power emitted at the laser source. Should the power loss exceed a certain predetermined level, the beam may be in need of realignment. If an excessive power loss is detected, the program is immediately shut down and may be returned to the alignment program 104. The laser is set to low power 50. The faulty work station is selected 54. The alignment program runs its course for that particular station.

Figure 4:
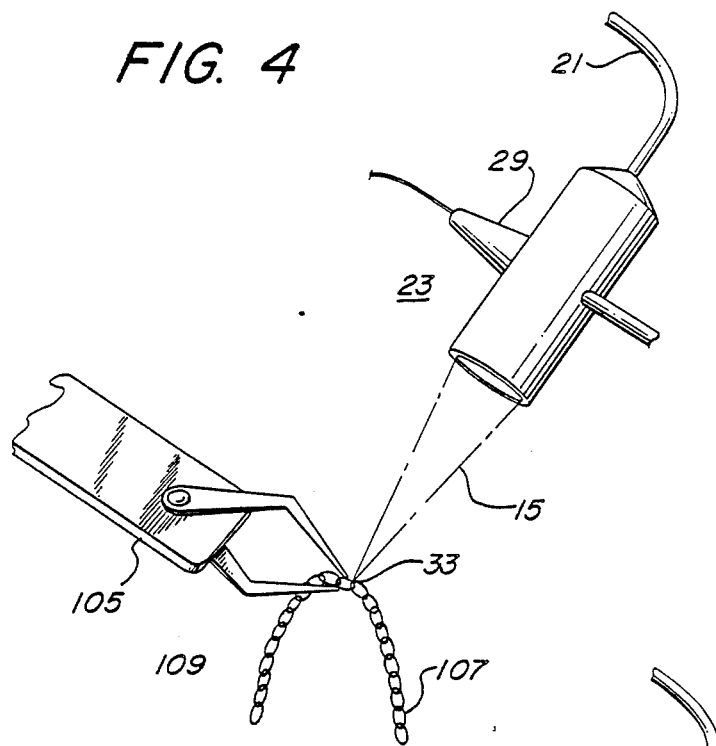
FIG. 4 is a perspective view of the laser beam welding gold chain.

The system described time shares the output of a single laser source among a plurality of work stations where the laser beam is put to useful work. Each station, for example, could cooperate with or be incorporated in an industrial robot or positioning device that manipulates a workpiece which requires welding or cutting. The system of the present invention has found extremely useful application in the manufacture of gold chains, producing superior results. In a gold chain production procedure, robots attach each successive link in the chain, bend the link closed, and properly present it in the path of the laser beam for welding. FIG. 4 illustrates the final welding operation of such a procedure. A robotic arm 105 positions the assembled but unwelded gold chain 107 so that the focus 33 of laser beam 15 precisely coincides with the joint to be welded. When the link is in the proper position, a signal is sent to the CPU 35 such that the identity of the station is entered into the queue 49. That station is subsequently selected, the mirror is brought to the corresponding position, and the laser is energized according to the previously entered parameters. Upon completion of the welding step, the robotic arm 105 or arms (not shown) manipulate the chain to bring the next unwelded link into position, and the operation is repeated to produce a length of finished gold chain 109. A whole series of such robots, one at each work station, can be supplied by a single laser. The beam is successively diverted to each work station when that station is ready for the welding operation.

Figure 5:
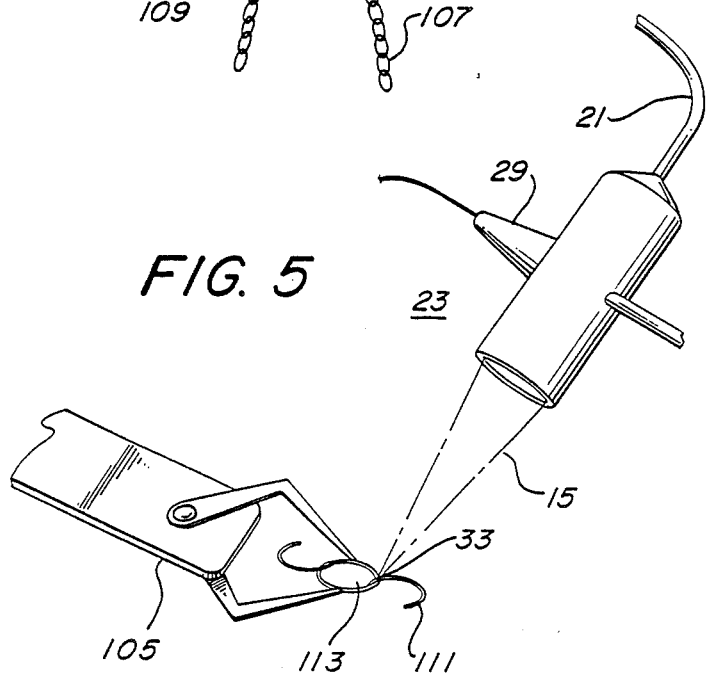
FIG. 5 is another perspective illustration of the laser beam being used to manufacture interocular lenses.

Another highly advantageous use of the described system is in the manufacture of interocular lenses. Robotic positioning devices successively select unfinished interocular lenses, bring them into position (FIG. 5) so that the laser can perform its function such as, for example, attaching the haptic component 111 to the optic portion 113. This requires a delicate welding procedure wherein a hook 111 or tab is attached to the actual lens portion 113. Upon completion of the weld, another unfinished lens is selected and the procedure is repeated. In this manufacturing procedure, only short bursts of the laser beam are required, interspersed by relatively long periods of manipulation of the workpiece.

Obviously, many modifications and variations of the present invention are possible in light of the above teaching. It is therefore to be understood that, within the scope of the appended claims, the invention may be practiced otherwise than as specifically described.

What is claimed is:

1. A laser multiplexer for time-sharing a high-power laser among a plurality of work stations, comprising:
   a single laser light source capable of producing a high powered laser beam;
   a plurality of optic fibers, one optic fiber for each one of said plurality of work stations, for conducting the laser beam through an interior of the optic fiber to its respective work station;
   means for measuring the laser beam reaching a particular work station through the interior of the selected optic fiber; and
   means responsive to the measurement for coupling the laser beam into an output end of the optic fiber so that the intensity of the laser beam exiting the optic fiber at the work station is at a maximum.

2. The laser multiplexer of claim 1 wherein said means for selectively coupling the laser beam into the interior of a particular optic fiber comprises means for focusing the laser beam onto an input end of the optic fiber.

3. The laser multiplexer of claim 2 wherein said focusing means comprises means for automatically determining the focus parameters for input of the laser beam into the optic fiber which produce the maximum intensity at the output of the optic fiber.

4. The laser multiplexer of claim 2 wherein the means for focusing laser light comprises a movable mirror.

5. The laser multiplexer of claim 1 wherein the means for selectively coupling the laser beam comprises:
   means for selectively focusing the laser beam into a selected optic fiber;
   means for storing the focus parameters of the laser beam for each optic fiber which yield a maximum intensity at each work station; and
   means for selectively recalling the focus parameters for a particular station and causing the focusing means to direct the laser beam accordingly.

6. The laser multiplexer of claim 5 further comprising a means for controlling the laser such that a laser beam pulse of specified power is produced a specified number of times for specified durations separated by specified intervals only while the laser beam is properly focused into a specified optic fiber.

7. The laser multiplexer of claim 6 further comprising:
   storage means for storing the power parameters for each station;
   storage means for storing the identity of the stations ready to receive the laser beam; and
   selecting means for selecting a ready station,
   whereby, upon selection of a ready station, the stored focus parameters for the selected station are recalled, the laser beam is focused according to the recalled parameters, and the controlling means causes the light source to produce a laser beam according to the stored power parameters for the selected station.

8. The laser multiplexer of claim 7 wherein said selecting means selects a next ready station stored in said storage means on the basis of its power specification so that only a minimum change in power over the previously-selected station is required.

9. A method of multiplexing a high-powered laser beam among a plurality of receivers capable of measuring the received beam's intensity, comprising the
   scanning, in a stepwise manner, the laser beam at low power across each receiver;
   measuring the intensity of the received laser beam at each step;
   determining which step yielded a maximum intensity at each receiver;
   memorizing that step for each receiver;
   recalling and returning to that step whenever a particular receiver is ready to receive; and
   energizing the laser at a predetermined high-power level.

10. The method of multiplexing the laser beam of claim 9, further comprising the steps of:
    measuring the intensity of the laser beam received at the receiver during high-power energization; and
    rescanning, in a stepwise manner, the laser beam at lower power across that particular receiver if the measured intensity during the high-power energization falls below a predetermined level in order to determine and memorize a new step which yields maximum intensity at that receiver.

11. The method of multiplexing the laser beam of claim 10, further comprising the steps of:
prioritizing the selection of receivers ready to receive on the basis of their specified high-power requirement such that a minimal amount of power variation is required.

12. A laser multiplexer for time-sharing a high-power laser among a plurality of remote work stations, comprising:
a single variable-power laser source capable of producing a high-power laser beam;
a variable position mirror positioned in the laser beam's path;
a plurality of optic fibers capable of receiving the laser beam reflected off the mirror and conducting the beam to remote work stations;
a detector positioned at each work station capable of measuring the intensity of the laser beam arriving at the work station;
a CPU capable of determining the position of the mirror that yields a maximum intensity at each work station's detector;
a first RAM capable of storing the position of maximum intensity for each work station;
an input means for specifying pulse power, pulse duration, pulse interval and total number of pulses required at each station;
a second RAM capable of storing these pulse specifications;
a queue for holding those work stations ready to receive the laser beam as specified; and
said CPU also being capable of sequentially selecting work stations ready to receive a laser beam, causing the mirror to be moved to the corresponding position held in the first RAM, energizing the laser source according to the specifications held in the second RAM, and causing the position for maximum intensity to be redetermined if the intensity of the laser beam arriving at the work station as measured by the detector falls below a predetermined level.

13. A method for time-sharing a high-power laser among a plurality of work stations for the purpose of performing useful work such as precision welding or cutting, said method comprising the steps of:
determining the focus parameters between the laser and each input of a plurality of fiber-optic cables, each cable being assigned to a respective work station;
storing the focus parameters for each work station;
manipulating a workpiece at a work station to present it to a laser beam output from the respective fiber-optic cable;
retrieving the focus parameters for the work station ready to receive the laser energy; and
focusing the output of the high-power laser according to the retrieved focus parameter into the input of the respective fiber-optic cable, thereby transmitting the laser energy to the work station.

14. The method of claim 13 further comprising the steps of:
measuring the intensity of the laser beam arriving at a work station;
refocusing the laser beam at the input of the fiber-optic cable if the measured intensity falls below a certain level; and
storing the new focus parameters for use with that work station.

15. A method of time-sharing a single laser to weld gold links in a process for manufacturing a plurality of gold chains, the method comprising the steps of:
determining the focus parameters between the laser and each input of a plurality of fiber-optic cables, each cable being assigned to a respective work station;
storing the focus parameters for each work station;
manipulating unfinished gold chains at each assembler so as to present one link at a time for welding by an appropriately deflected laser beam;
retrieving the stored focus parameters for the work station ready to receive the laser energy; and
focusing the output of the high-power laser, according to the retrieved focus parameters, into the input of the respective fiber-optic cable.

16. The method of claim 15 further comprising the steps of:
measuring the intensity of the laser beam arriving at the work station;
refocusing the laser beam at the input of the fiber-optic cable if the measured intensity falls below a certain level; and
storing the new focus parameters for use with that work station.

17. A method of time-sharing a single laser to weld links in a process for manufacturing a plurality of interocular lenses simultaneously, the process comprising the steps of:
determining the focus parameters between the laser and each input of a plurality of fiber-optic cables, each cable being assigned to a respective work station;
storing the focus parameters for each work station;
manipulating interocular lenses at each work station so as to present the lens for welding by an appropriately deflected laser beam;
retrieving the stored focus parameters for each work station ready to receive the laser energy; and
focusing the output of the high-power laser according to the retrieved focus parameters into the input of the respective fiber-optic cable.

18. The method of claim 17 further comprising the steps of:
measuring the intensity of the laser beam arriving at the work station;
refocusing the laser beam at the input of the fiber-optic cable if the measured intensity falls below a certain level; and
storing the new focus parameters for use with that work station.

19. A laser time sharing system for sharing a single laser among a plurality of work stations, the laser time sharing system comprising:
a single laser device, the laser device capable of outputting a laser beam;
a plurality of fiber optic transmission lines, each line having an input and an output, for transmitting the laser beam to one of the plurality of work stations;
a beam directing means for selectively coupling the laser beam to the input of one of the fiber optic transmission lines by selectively directing the laser beam;

a measuring means located at each work station for continuously detecting an intensity of the laser beam being output at the particular station and for providing a power detection signal;

a single CPU for obtaining the most optimum coupling between the laser beam and the inputs of the fiber optic transmission lines, the single CPU controlling the beam directing means in response to the continuous power detection signals being provided by each measuring means.

* * * * *